M. TURK.
HAY RAKE ATTACHMENT.
APPLICATION FILED DEC. 17, 1913.

1,136,565.

Patented Apr. 20, 1915.

Witnesses
J. C. Simpson
Harry M. Test

Inventor
M. Turk
By Chandler & Chandler
Attorneys

UNITED STATES PATENT OFFICE.

MAX TURK, OF HURON, SOUTH DAKOTA.

HAY-RAKE ATTACHMENT.

1,136,565. Specification of Letters Patent. Patented Apr. 20, 1915.

Application filed December 17, 1913. Serial No. 807,314.

*To all whom it may concern:*

Be it known that I, MAX TURK, a citizen of the United States, residing at Huron, in the county of Beadle, State of South Dakota, have invented certain new and useful Improvements in Hay-Rake Attachments; and I do hereby declare the following to be a full, clear, and exact description of the invention, such as will enable others skilled in the art to which it appertains to make and use the same.

This invention relates to improvements in hay rakes and particularly horse hay rakes.

The principal object of the invention is to provide an attachment for a hay rake which will prevent the hay rolling out of either side of the rake as it is drawn along, especially when going in the direction of the wind.

Another object is to provide a simple device of this character which will effectively accomplish the result desired, and which will assume normal position when the hay has been dumped.

Other objects and advantages will be apparent from the following description, when taken in connection with the accompanying drawing.

Figure 1:
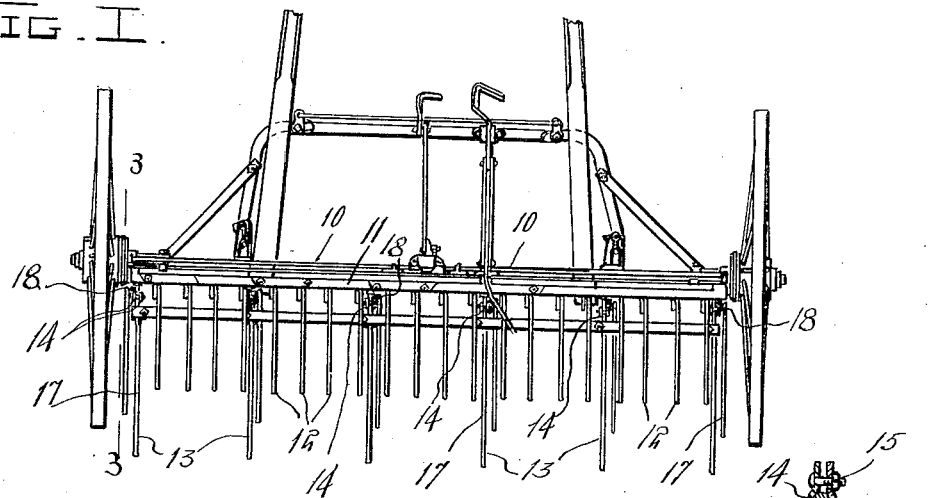
Figure 4:
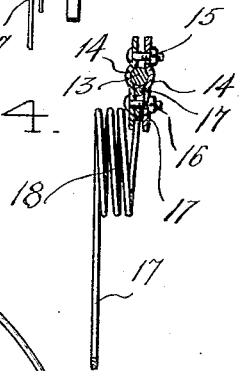
Figures 2, 3:
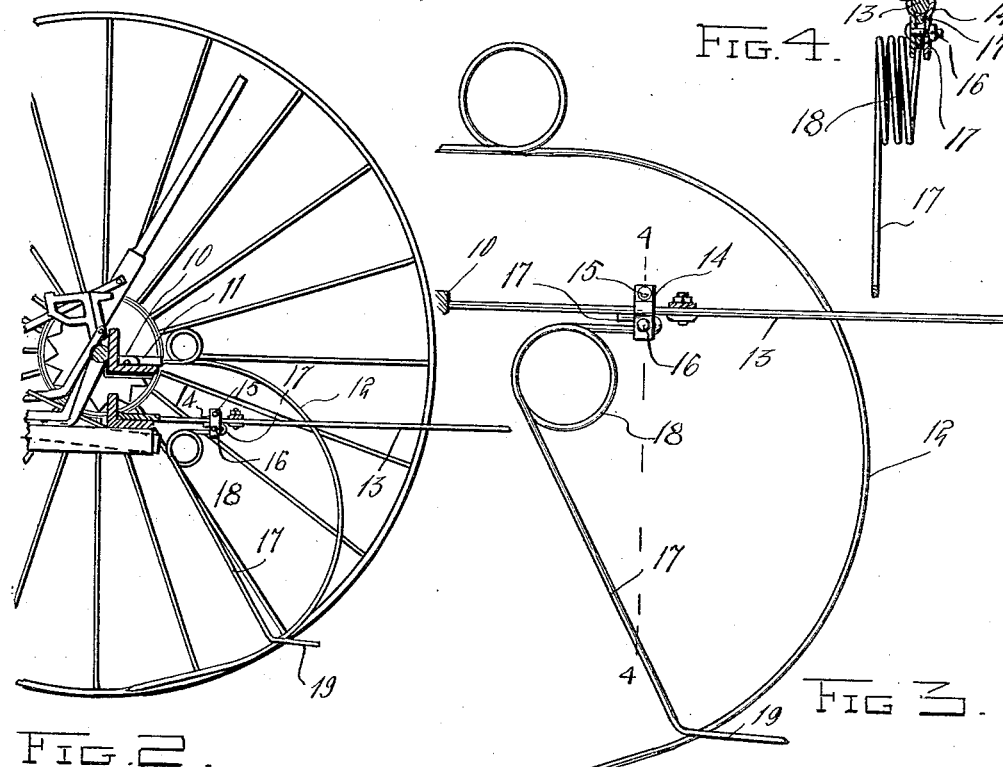

In the drawing: Figure 1 is a top plan view of a hay rake having my invention incorporated therewith. Fig. 2 is a side elevation of a portion of the hay rake. Fig. 3 is a vertical longitudinal sectional view on the line 3—3 of Fig. 1. Fig. 4 is a vertical transverse sectional view on the line 4—4 Fig. 3.

Referring particularly to the accompanying drawing, 10 represents the frame of the hay rake on which is mounted the transversely extending bar 11 which carries the rake teeth 12. The ends of this bar 11 are suitably journaled in the frame so that the bar can be rocked to lift the rake teeth in the usual manner. Secured to the frame and extending rearwardly between the rake teeth are the usual stripper bars or fingers 13. Secured to certain of these fingers are the oppositely disposed plates 14, these plates being held together tightly to the fingers above and below by means of the bolts 15 and 16. Disposed between the lower ends of each pair of plates 14, and engaged on the bolt 16 is one end of a resilient finger 17 which forms particular subject-matter of this application. Below the point of attachment of the finger there are formed several coil turns 18, from the last one of which the finger extends downwardly and rearwardly toward the spaces between the rake teeth 12. The rear end portion of the finger is bent to extend in approximately a horizontal position, as clearly indicated at 19.

As the rake is drawn forward, the hay is gathered up by the points of the teeth. Some of the hay gets past the fingers 17, while the rest of the hay forces the fingers 17 upwardly as it accumulates. Thus the hay practically surrounds the fingers 17 and is prevented from rolling off to one side of the rake either by its own weight or by the wind. When the hay is dumped, that is, when the rake teeth 12 are lifted the hay will fall to the ground thus relieving the pressure on the fingers 17 and permitting them to spring back to the normal position by reason of the coil turns 18.

From the foregoing it will readily be seen that I have provided a simple device of this character, and one which can be readily applied to the ordinary hay rake now on the market without any alteration thereto whatever.

What is claimed, is:—

In an attachment for a hay rake, the combination with the stationary stripper fingers of the rake, of clamps carried by certain of the stripper fingers, downwardly and rearwardly extending resilient hay holding fingers secured at one end to the said clamps and having coil turns adjacent the points of attachment thereof, and angularly bent terminals normally projecting between the teeth of the rake, said fingers being adapted to spring rearwardly under the pressure of the hay and hold the hay from falling out at the sides of the rake.

In testimony whereof I affix my signature in the presence of two witnesses.

MAX TURK.

Witnesses:
F. T. TOBIN,
W. A. LYNCH.

Copies of this patent may be obtained for five cents each, by addressing the " Commissioner of Patents, Washington, D. C."